Figure 1:
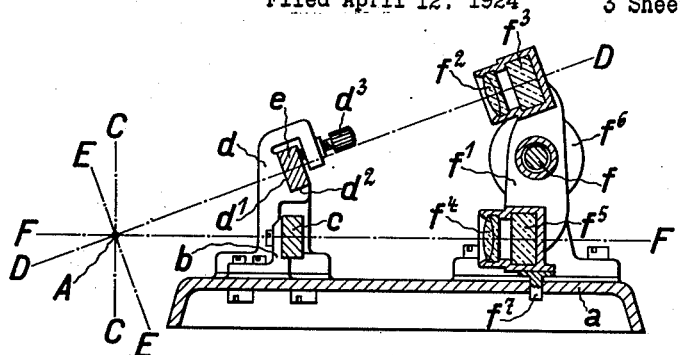

Jan. 27, 1925.　　　　　　　　　　　　　　　　　　1,524,089
O. EPPENSTEIN
MEASURING DEVICE
Filed April 12, 1924　　　3 Sheets-Sheet 1

Inventor:
Otto Eppenstein

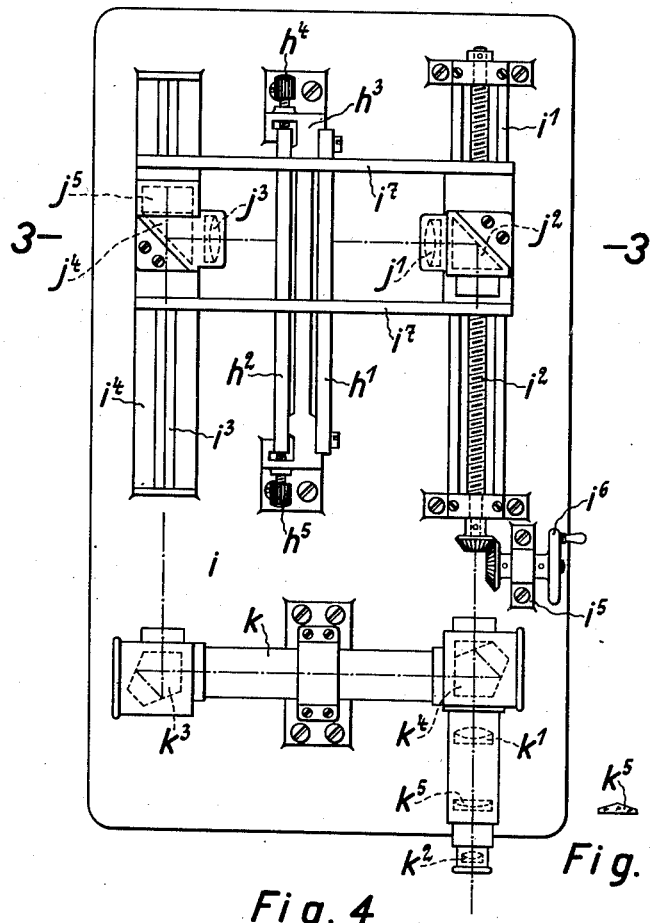

Jan. 27. 1925.  
O. EPPENSTEIN  
MEASURING DEVICE  
Filed April 12, 1924    3 Sheets-Sheet 3

1,524,089

Inventor:  
Otto Eppenstein

Patented Jan. 27, 1925.

1,524,089

UNITED STATES PATENT OFFICE.

OTTO EPPENSTEIN, OF JENA, GERMANY, ASSIGNOR TO THE FIRM OF CARL ZEISS, OF JENA, GERMANY.

MEASURING DEVICE.

Application filed April 12, 1924. Serial No. 706,183.

*To all whom it may concern:*

Be it known that I, OTTO EPPENSTEIN, a citizen of Germany, and residing at Jena, Germany, have invented a new and useful Measuring Device (for which I have filed an application in Germany April 19th, 1923), of which the following is a specification.

The present invention relates to measuring devices for comparing two distances with each other with which the points determining the distances to be tested are adjusted by being sighted at with suitable sighting devices. In order to attain with these measuring devices the highest possible accuracy, the two distances to be compared with each other have, in accordance with a principle laid down by E. Abbe, been disposed in a straight line, i. e. in succession. In that case the result of measurement is almost not impaired by inaccuracies of the guides in which the parts to be displaced, e. g. the sighting devices are disposed, when carrying out the comparison. However, this arrangement has the drawback that the measuring device becomes comparatively long, viz. at least equal to double the length of the object to be measured, so that the use of the Abbe principle is generally confined to devices for shorter objects.

According to the present invention, however, it is possible, in order to avoid the great length of the measuring device, to dispose the two distances to be compared with each other in a parallel direction side by side and yet to become in the same degree independent of inaccuracies of the aforesaid guides as by carrying out the Abbe principle. According to the invention this independence can in this case be attained by providing a sighting device which contains two optical systems, rigidly connected with each other, displaceable parallelly to the distances, collective and deflecting the axial ray by 90°, each of which systems forms an additional system for a fixed telescope, whose objective axis is parallel to the distances. These systems are constructed and disposed in such a way that firstly the front focal point of each of the two systems lies on that distance which is sighted at with the respective system, and that in the second place those points of the optical axes of the two additional systems coincide, each of which has the property that a luminous ray, aiming at it from the object-space and travelling in the plane which is determined by the optical axis of the respective additional system and the distance to be sighted at with it, emanates from the additional system with respect to the optical axis at an angle, equal according to size and sign, to that angle at which it is inclined to this axis in the object-space.

Each of the additional systems together with the appertaining telescope then forms a microscope having a broken optical axis, of which microscope the one part, the telescope, is stationary and of which the other part, the additional system, is displaceable. Moreover, owing to the aforesaid particular position of the focal points of the additional systems provision has been made that between each of these systems and the appertaining telescope rays, emerging from an object-point, travel parallel to each other, so that the additional system can be displaced at will in the direction of the objective axis of the telescope, i. e. parallelly to both distances. As will be explained later on by a few constructional examples, provision has furthermore been made, by uniting the two particular points, named in the second place, of the optical axes of the two additional systems, that the rotations about small angles, which are connected with a displacement of these systems, even with carefully constructed guides, will have no detrimental effect upon the result of measurement. Each of the two additional systems contains besides the lens system, which images at infinity the distance-points to be sighted at with it, a reflecting system, breaking the optical axis in the requisite way. If the reflecting system be of such construction as not to cause an inverted image in the plane determined by the optical axis of the additional system and the distance to be sighted at with it, the particular axial point, previously mentioned in the second place, of the additional system coincides with the front positive nodal point of the respective lens-system. If, however, the respective reflecting system causes an inversion of the image in the said plane, the said point coincides with the front negative nodal point of the respective lens system. At least one of the additional systems must, of course, be so arranged that the said point comes to lie outside a lens- or reflecting body, either by constructing the lens system, when using a reflecting system causing no inversion of the image in the said plane, in such a manner that the front positive nodal point of this system comes to lie outside the lens- and reflecting bodies, or by employing a reflecting system causing an inversion of the image in the said plane, so that the front negative nodal point comes into question. The two displaceable systems may further be located in front of a telescope each, which is separated from the other, or both in front of one and the same telescope.

Figure 2:
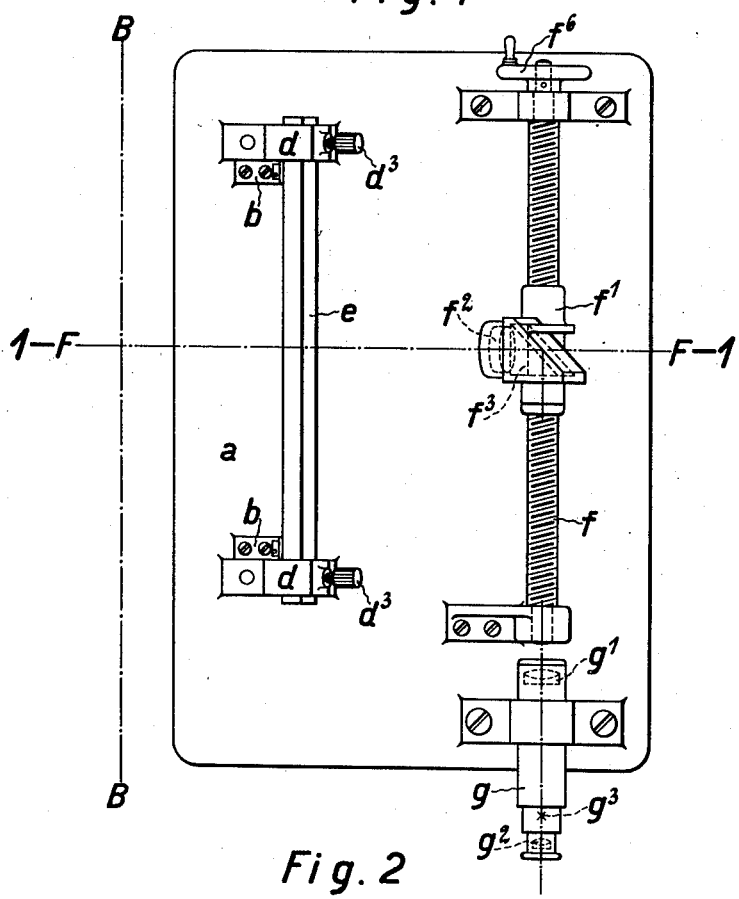
Figure 7:
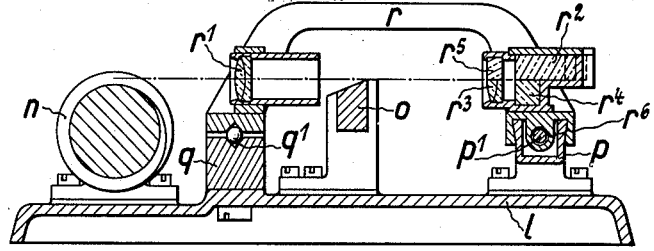
Figures 8, 10:
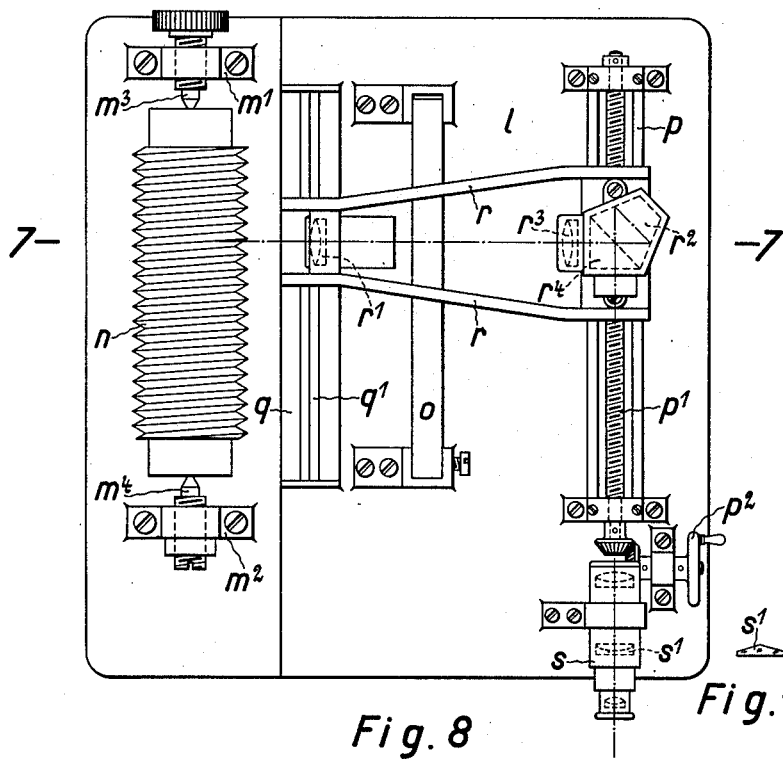
Figure 9:
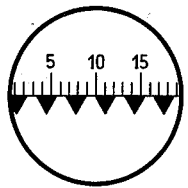

In the annexed drawing the subject of the invention is illustrated by three different constructional examples. Figs. 1 and 2 show a device which is destined for comparing measuring scales with the aid of a standard scale; Fig. 1 is a cross section on the line 1—1 of Fig 2 (Fig. 2) in a plan elevation. The same purpose also serves the second device shown in Figs. 3 to 6; Fig. 3 is a cross section on the line 3—3 of Fig. 4, Fig. 4 is a plan elevation, Figs. 5 and 6 show details. The third device shown in Figs. 7 to 10 serves for comparing the pitch of bolt-screws by means of a measuring scale; Fig. 7 is a cross section on the line 7—7 of Fig. 8, Fig. 8 is a plan elevation, Fig. 9 shows the image presented to the observer, Fig. 10 shows a detail.

In the device represented in Figs. 1 and 2 there are fixed on a base plate $a$ two angular pieces $b$ to which is rigidly screwed a measuring scale $c$ which is to serve as a standard scale. In addition to the angular pieces $b$ the base plate carries two supports $d$, each of which is provided with two bearing surfaces $d^1$ and $d^2$ and a set-screw $d^3$. In these supports the measuring scale to be tested and denoted by $e$ is to be fixed. Opposite the measuring scales and parallel to them there is supported a screw spindle $f$ which carries a holder $f^1$, provided with a corresponding female thread, for two optical systems. The upper optical system consists of a collective lens $f^2$ and an isosceles, rectangular reflecting prism $f^3$, whilst the lower system consists of a collective lens $f^4$ and an isosceles, rectangular reflecting prism $f^5$. The spindle $f$ is provided with a hand wheel $f^6$. The body $f^1$ has an extension $f^7$ which projects into a slit of the base plate $a$ and slides therein with a rotation of the spindle $f$, so that the body $f^1$ can only undergo a displacement along the spindle. Moreover, on the base plate $a$ there are fixed two superposed telescopes $g$, of which only the one is shown in the drawing. The optical system of each of these telescopes consists of a collective lens $g^1$ as an objective and of another collective lens $g^2$ as an ocular. Besides, in the image plane of each of these telescopes provision is made for a reading mark $g^3$. The system $f^2$, $f^3$ serves together with the upper telescope for sighting at the graduation of the measuring scale $e$. The axis of this system broken by the prism $f^3$ passes therefore with its part, lying before the system, through the graduation of this scale and coincides with its part, lying behind the system, with the optical axis of the upper telescope. The front focal point of the lens $f^2$ lies on the graduation of the measuring scale $e$ and the front negative nodal point of this lens lies at the point A, whose distance from the lens is approximately double its focal length. Owing to the use of the singly reflecting prism $f^3$ the front negative nodal point of the lens $f^2$ is in this case that particular axial point of the system $f^2$, $f^3$ located before the upper telescope at which system a ray, travelling in the object space in the plane determined by the optical axis of the system $f^2$, $f^3$ and the gaduation of the scale $e$, must aim if it is to emerge from the system $f^2$, $f^3$ with respect to the axis at the angle of inclination, equal according to size and direction, at which it is inclined to the axis in the object-space. The system $f^4$, $f^5$ serves together with the lower telescope for sighting at the graduation of the measuring scale $c$. The likewise broken optical axis of this system passes therefore with its part, lying before the system, through the graduation of the measuring scale $c$ and coincides with its part, lying behind the system, with the axis of the lower telescope. The front focal point of the lens $f^4$ lies on the graduation of the measuring scale $c$ and the front negative nodal point of this lens, which is of the same importance to the system $f^4$, $f^5$ as the front negative nodal point of the lens $f^2$ to the system $f^2$, $f^3$, also lies at the point A, thus coinciding with the front negative nodal point of the lens $f^2$.

The device is suitably used in the following manner. By rotating the hand wheel $f^6$ the body $f^1$ with the two additional systems $f^2$, $f^3$ and $f^4$, $f^5$ is first adjusted in such a way that in the lower telescope $g$ the mark $g^3$ coincides with the zero line of the graduation of the measuring scale $c$. Hereupon one clamps the scale $e$, the graduation of which is to be compared with that of the scale $c$, in the support $d$ in such a way that in the field of view of the upper telescope $g$ the zero line of the graduation of the measuring scale $e$ coincides at least approximately with the mark. By rotating the hand wheel $f^6$ the user then changes several times the position of the body $f^1$ and reads off after each change the position of the linear marks in the two telescopes $g$ relatively to the corresponding graduations.

As may be easily seen, in this device as well as in a comparator, carried out according to Abbe's principle, rotations of the displaceable, optical systems about small angles, as cause during the displacement of these systems by the unavoidable imperfections of the guides, are harmless. If, for instance, the body $f^1$ rotates about an axis B—B, the divisions of the measuring scales only move up and down in the fields of view of the telescopes, whereby the reading undergoes no variation. A rotation of the body $f^1$ about an axis C—C, passing through the front negative nodal point of the lens $f^4$ and being perpendicular to the plane determined by the optical axis of this lens and the graduation of the scale $c$, will not bring about any change in the image of the graduation of the scale $c$ as long as small angles of rotation are in question. For, owing to the image-reversing effect of the prism $f^5$ connected with this lens, the front negative nodal point of the lens $f^4$ may be regarded as the front positive nodal point of the system $f^4$, $f^5$ with respect to the plane determined by the optical axis of the lens $f^4$ and the graduation of the scale $c$, and, as is well known, a rotation of an imaging system about its front positive nodal point does not affect the image attained by the system as long as the rotation is restricted to certain limits. However, a rotation about the axis C—C does also not change the image of the second graduation, as may be easily seen by dividing the rotation in one about an axis D—D and another about an axis E—E, both of which do not affect the image of the second graduation. In the same way it results that also a rotation about an axis F—F is harmless to both the system $f^4$, $f^5$ and the system $f^2$, $f^3$. As, however, a rotation about an optical axis which does not pass through the point A can be replaced by a displacement and a rotation about an axis which does pass through this point, it is obvious that also a ratation of the body $f^1$ in the above degree about an optical axis is harmless, and it may be seen that with the present device a comparatively high accuracy of measuring may still be attained unless particular care is taken in the manufacture of the guides for the parts to be displaced during the measurement.

In the device shown in Figs. 3 to 6 the two measuring scales to be compared with each other and denoted by $h^1$ and $h^2$ respectively are fixed on a holder $h^3$, viz. the latter, $h^2$, in such a way that it may easily be exchanged and a little displaced in its longitudinal direction by means of two screws $h^4$ and $h^5$. The holder $h^3$ is fixed on a base plate $i$. On the latter there are disposed parallelly to the measuring scales a carriage guide $i^1$ with a screw spindle $i^2$ and a sliding rail $i^4$ having a groove $i^3$, moreover a bearing $i^5$ with a hand wheel $i^6$ which is coupled to the spindle $i^2$ and is to serve for rotating this spindle. On the carriage guide $i^1$ there is displaceable a bridge $i^7$ which engages at its one end with the aid of a nut $i^8$ in the screw spindle $i^2$ and which rests with its other end on the sliding rail $i^4$, whereby between the bridge and the sliding rail there lies a ball $i^9$ in the groove $i^3$. The bridge $i^5$ carries two optical systems, of which the one consists of a collective lens $j^1$ and an isosceles, rectangular reflecting prism $j^2$, whilst the other consists of a collective lens $j^3$ and a set of prisms composed of two isosceles, rectangular prisms $j^4$ and $j^5$. The optical systems $j^1$, $j^2$ and $j^3$, $j^4$, $j^5$ from both additional systems for a telescope $k$, provided with an objective $k^1$, an ocular $k^2$ and two pentagonal prisms $k^3$ and $k^4$. Besides, in order to attain an exit pupil common to both additional systems, a double wedge $k^5$ is disposed in the focal plane of the telescope. As may be seen from Figs. 3 and 5, the one half of the lens $j^3$ and the prism $j^4$ is cut away in height in order that the ray pencil imaging the measuring scale $h^2$ may be reflected by the prism $j^5$ across the prism $j^4$ with an ever stationary height of the optical axis of this pencil. The optical axes of the collective lenses $j^1$ and $j^3$ determine together with the graduations of the two measuring scales a single plane. The focal point of the lens $j^1$ lies in graduation of the scale $h^1$ and the focal point of the lens $j^3$ in the graduation of the scale $h^2$. As the set of prisms $j^4$, $j^5$ causes no inversion of the image in the direction of the plane determined by the graduations and the optical axes of the lenses $j^1$ and $j^3$ and as the prism $j^2$ inverts, however, the image in the direction of this plane, the front positive nodal point of the lens $j^3$, lying in this lens itself, and the front negative nodal point of the lens $j^1$, having from this lense a distance equal to double the focal length of the lens, have in this case been brought into coincidence.

The two graduations simultaneously appear in the field of view of the telescope one beneath the other and, in order to test the one of them, the user will therefore only have to cause both of them, by rotating the hand wheel $i^6$, to travel across the field of view of the telescope and to ascertain whether both agree with each other or by which amount the divisions of the one differ from those of the other.

It is obvious that with the displacement of the bridge $j^7$ any possible rotation about the optical axis of the two collective lenses $j^1$ and $j^3$ is without detrimental effect upon the reading within the actually existing angles of rotation and likewise a rotation about an axis running parallelly to the graduations. As, however, also a rotation about an axis, passing through the coinciding nodal points of the collective lenses $j^1$ and $j^3$ and being perpendicular to the two aforesaid axes, is harmless, it follows that also in this case the rotations, rendered possible by imperfections of the guides, of the displaceable optical systems about optionally located axes do not impair the reading.

In the device shown in Figs. 7 to 10 the pitch of one or several threads forms at any one time the one of the two distances to be compared with each other and the graduation of the measuring scale the other. On a base plate $l$ are fixed two standards $m^1$ and $m^2$, of which the first is provided with a point $m^3$ and the second with a point $m^4$. Between both points the screw bolt $n$ to be tested at any one time must be fixed. On the base plate $l$ is further disposed parallelly to the axial direction of both points a measuring scale $o$, a carriage guide $p$ with a screw spindle $p^1$ as well as a guide rail $q$ provided with a longitudinal groove $q^1$. On the carriage guide $p$ and the rail $q$ rests a displaceable bridge $r$ which engages in the spindle $p^1$ by means of a nut $r^6$. The spindle is coupled to a hand wheel $p^2$ by means of which it can be rotated. The bridge $r$ carries two optical systems, of which the one consists of a collective lens $r^1$ and a pentagonal prism $r^2$, whilst the other is composed of a collective lens $r^3$ and an isosceles, rectangular prism $r^4$. The systems $r^1$, $r^2$ and $r^3$, $r^4$ form both additional systems for a telescope $s$ which, in order to attain an exit pupil common to both systems, is provided with a double wedge $s^1$. The telescope $s$ serves together with the system $r^1$, $r^2$ for viewing the threads of the screw bolt $n$ to be tested. Hence, the focal point of the collective lens $r^1$ is located into a vertical plane passing through the axes of the points $m^3$ and $m^4$. In addition, the telescope $s$ serves together with the system $r^3$, $r^4$ for viewing the graduation of the measuring scale $o$ disposed on the side, facing the collective lens $r^3$, of this measuring scale. The focal point of the lens $r^3$ is therefore placed into this side of the measuring scale. In order that a part of the rays traversing the collective lens $r^1$ gets into the objective-aperture of the telescope, the collective lens $r^3$ is only constructed as a semi-circular disc and each of the prisms $r^2$ and $r^4$ has only a height equal to half the diameter of the telescope objective. The collective lens $r^3$ is completed by a semi-circular plane-parallel plate $r^5$ to a full circular disc. In this manner a profile of the thread, the pitch of which is to be tested, and an image of the graduation of the measuring scale $o$ are produced side by side in the image field of the telescope $s$. (Vide Fig. 9.) The pitch of the thread at any place of the bolt can then directly be read off on the graduation without the aid of a measuring mark. Finally, it may be mentioned that the front negative nodal point of the collective lens $r^3$, which is located in front of this lens at a distance equal to double its focal length, coincides with the front positive nodal point of the lens $r^1$, lying in the latter itself.

When using this device, the system $r^1$, $r^2$, after the bolt $n$ to be tested has been fixed between the points $m^3$ and $m^4$, is adjusted by rotating the hand wheel $p^2$ to various places of the bolt $n$ in succession and the corresponding pitch-values are read off on the graduation of the scale $o$ in the telescope $s$.

It may easily been seen that also in this case the unavoidable rotations, which the optical systems $r^1$, $r^2$ and $r^3$, $r^4$ undergo with the displacement of the bridge $r$, do not impair the result of measurement. In the first place it is obvious that a rotation about the common optical axis of the two collective lenses $r^1$ and $r^3$ is not detrimental, likewise with respect to both systems $r^1$, $r^2$ and $r^3$, $r^4$ a rotation of the bridge $r$ about a vertical axis, passing through the front positive nodal point of the lens $r^1$, i. e. through this lens itself, since this axis simultaneously traverses the front negative nodal point of the lens $r^3$ and since in the horizontal plane, passing through the optical axis of the collective lenses, the prism $r^2$ appertaining to the lens $r^1$ does not cause an inversion of the image, but that in this plane the image is inverted by the prism $r^4$ appertaining to the lens $r^3$. Moreover, a rotation about a horizontal axis, which is perpendicular to the optical axis of the collective lenses $r^1$ and $r^3$ and therefore also to the aforesaid two axes of rotation, is harmless since such a rotation only entails a travelling up and down of the image in the field of view of the telescope. It is thus proved that also in this case a rotation of the bridge, carrying the additional systems for the telescope, about any axis is harmless as long as the supposed rotations about small angles are concerned.

I claim:

In a measuring device means for disposing parallelly to each other two distances to be compared with each other, two rigidly connected optical systems, means for displacing these systems parallel to the said distances, these optical systems comprising collective members and members adapted to deflect the axial ray by 90°, of which systems one each faces one of the said distances, an observing system rigidly disposed and adapted to receive the rays coming from the said two optical systems, the entrance axis of which observing system is parallel to the direction of displacement of the said two optical systems, these two systems having each its front focal point on the distance facing it, and of these two systems those points of the optical axes coinciding with each other, each of which has the property that a luminous ray, aiming at it from the object-space and travelling in the plane determined by the optical axis of this optical system and the distance upon which it is directed, emerges from this system with respect to the optical axis at an angle, equal according to size and sign, to that angle at which it is inclined to the optical axis in the object-space.

OTTO EPPENSTEIN.